Feb. 19, 1957 J. H. CANTLIN 2,782,285
AIR FLOW AND LIQUID LEVEL DETECTION AND CONTROL APPARATUS
Filed Sept. 13, 1954 2 Sheets-Sheet 1
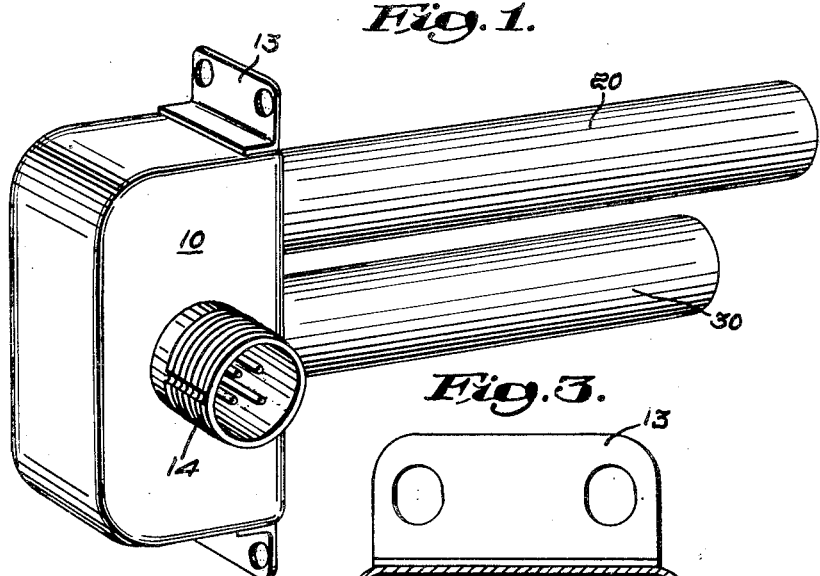
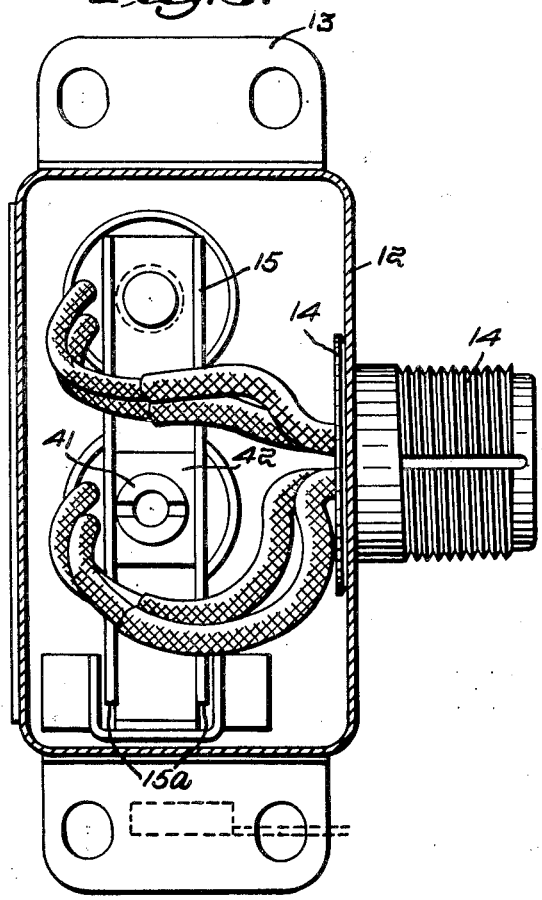
Inventor:
John H. Cantlin,
by Emery, Booth, Townsend, Miller & Widner
Attys

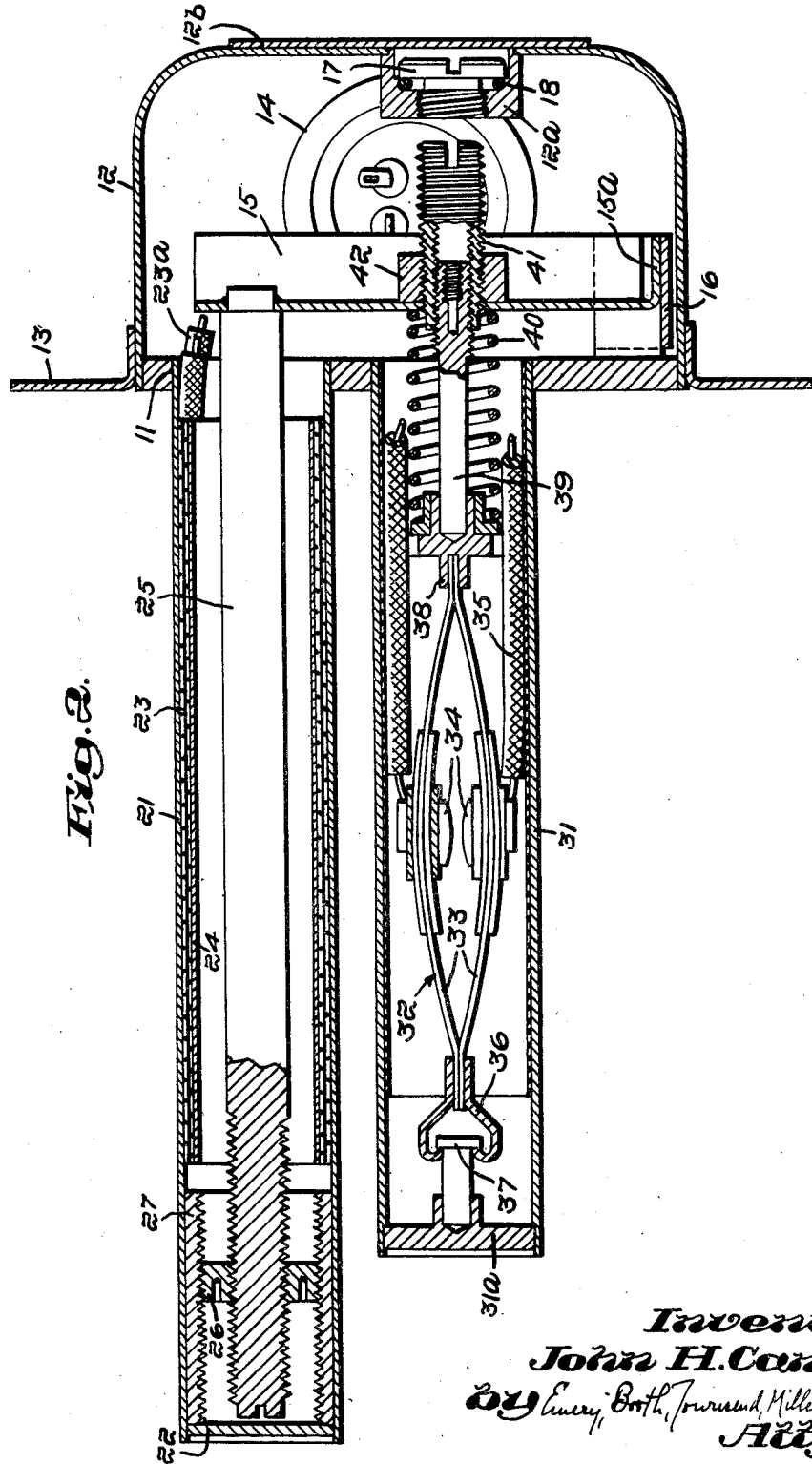

United States Patent Office 2,782,285
Patented Feb. 19, 1957

2,782,285

AIR FLOW AND LIQUID LEVEL DETECTION AND CONTROL APPARATUS

John H. Cantlin, Fayville, Mass., assignor to Fenwal Incorporated, Ashland, Mass., a corporation of Massachusetts Application September 13, 1954, Serial No. 455,639

5 Claims. (Cl. 200—122)

This invention relates generally to devices for the detection and control of a condition and more particularly to improvements in apparatus for sensing and signalling a state of fluid flow or level. The invention novelly provides for the control of fluid—gas or liquid—flow or level ordering and regulating systems and devices by sensing in a heated element the cooling effect of the medium subject to detection and control. The invention provides further an automatic compensation of variation of the temperature of such medium.

The invention will be better understood from a consideration of the following specification taken in conjunction with the accompanying drawing in which:

Fig. 1 is a perspective view of a controller of the invention;

Fig. 2 is a side elevation, partly in section, of the apparatus of Fig. 1; and

Fig. 3 is a vertical section taken lengthwise or at right angles to Fig. 2.

A preferred embodiment of the detection and control apparatus of the invention is shown in Figs. 1 and 2 to comprise generally a support or mounting unit indicated generally at 10, sensing or measuring unit or leg 20, and a signalling or indicating and ambient compensating unit or leg 30. The mount or head assembly 10 comprises more particularly a sealed casing or chamber defined by a rigid base plate 11, apertured to receive the legs 20, 30, and a cup-shaped hood or cover plate 12 assembled with the plate 11 with its rim received over and desirably flush with the periphery of the same. The base and cover plates 11, 12 are preferably fashioned of a rigid and durable metallic material finished as desired, rigidly joined as by welding, and hermetically sealed in known manner. The cover may be fitted with the illustrated or other bracket means 13, 13, for affixing the apparatus to and generally through a wall of the system or apparatus containing or exposed to the medium being detected, and herein also mounts an AN type connector 14, later to be referred to. The head assembly 10 further comprises the means for actuating the signalling device as ordered by the sensing and ambient compensating means and herein illustrated as a channel or other lever 15, supported from and for shifting vertically relative to the base plate 11. More particularly, the lever 15 may be welded to a plate-carried bracket 16 at a pivot or fulcrum defining end wall 15a, and may be further controlled and connected as hereinafter detailed.

The sensing element or leg 20 is seen to comprise an elongated tube or shell 21, closed at its outer or free end, as by a cap 22, and received at its other and open end through one of the above-mentioned apertures in the plate 12 and sealed thereat in rigid, unitary, and communicating assembly with the mounting or head unit 10 and also the signalling element or leg 30. The shell 21 is fashioned of a metallic material selected for a high coefficient of expansion and dimensioned such that the change in temperature gradient resultant from the change in cooling effect which the apparatus is designed to detect results in a measurable displacement of its outer or free end relative to the head assembly 10.

The sensing leg 20 further comprises a heat source, herein a woven type heater 23, of generally cylindrical construction received in and extending substantially over the length of the shell 21, as shown. A spring 24, which may be of split sleeve construction, is compressed within and expanded against heater 23, holding it securely and in good thermal contact with shell 21. The heater 23 may be energized in any convenient manner, as through leads 23a, Fig. 2, coupling it to the connector 14, Figs. 1 and 2. Surrounded by the heater 23 is a rigid metallic or other element or rod 25, which is predeterminedly fashioned of a material selected for a low coefficient of expansion. The rod 25 is supported from the outer end of the sensing leg or shell 21 by a nut 26 threaded over the rod and into a sleeve 27 rigidly fixed thereat. The free or inner end of the rod 25 is seen to project through the inner end of shell 21 and through plate 11 into the interior of the head assembly, and there to be joined or linked in convenient manner to the lever arm 15. The rod 25 will be understood to have a push-pull relation with the lever 15, such that any movement or displacement of the inner rod end relative to and more particularly into or out of the head assembly is accompanied by the similar translation or pivotal movement of the lever arm. The effective length of shell 21 and pull rod 25, and therefore the influence of the sensing leg 20 on lever 15, is seen further to be controlled or varied by adjustment of the nut 26.

Further in accordance with the invention, the ambient compensating unit or leg 30 comprises a sleeve or shell 31 fashioned similarly as the shell 21 of a rigid metallic material selected for a high coefficient of expansion. The shell 31 houses a control and signalling device, herein a switch of the bowed strut type such as shown and described in U. S. Patent No. 2,257,990. The element assembly or switch 32 consists more particularly of a pair of oppositely bowed metallic leaf springs or struts 33, 33 composed of a metal having a relatively low thermal expansion coefficient, such as Invar, and mounting centrally the insulated contacts 34, 34, coupled through conductors 35, 35 to the connector 14, through which it may be connected to operate visual and audible signals, trip circuit breakers, or actuate solenoid motor-driven valves, relays, and the like, all as well known to the art. The oppositely bowed springs 33, 33 are fixedly supported at their outer ends, and more particularly there clamped between the arms of a hanger 36 which is seen to be received over an anchor stud 37 fixed to the shell end wall 31a. The inner ends of the springs 33, 33 are similarly held fast in a flanged sleeve 38 from whose opposite end axially projects a threaded stud 39 of a length and proportion to be received through an opening in the lever 15 as shown. The sleeve 38 and stud 39 are adjustably fixed in desired push-pull relation with the said lever 15 by a spring 40 compressed between the under face of the lever and the sleeve flange and by an adjusting screw or sleeve 41 threaded over the stud 39 and through the nut 42 received on the lever upper face. The struts 33, 33 are thus supported for outward bowing or inward collapse as required by the relative axial displacement of the hanger 36, rigid, through stud 37, with the shell end wall 31a, and the anchor sleeve 38, similarly rigid, through stud 39, sleeve 41, and nut 42, with lever arm 15. The relative opening and closing movement of the strut anchoring elements 36, 38 will thus be seen to be initiated either by the pivoting of the lever 15, such as resulting from expansion or contraction of the sensing leg 20, or by longitudinal or axial movement of the outer end of the shell 31 relative to the said lever 15, such as resulting from expansion or contraction of the ambient compensating leg 30. It will be understood further that the adjustment of the sleeve 41 may be such as normally to place the movement-sensing switch element 33, 33 under an initial axial tension or compression. Access to the sleeve 41 may be through an opening in the cover plate 12 receiving a threaded sleeve 12a. After the desired adjustment is made, the apparatus may be sealed by a screw 17 turned down over a ring 18 seated in said sleeve. Upon final adjustment, the cavity in the sleeve 12a above the screw 17 may be filled up with cement and a plate 12b sealed over the cover opening.

The operation of the apparatus of Figs. 1 and 2 in accordance with the invention affords detection and control of fluid flow or level by the sensitive and accurate measurement and indication or sensing and signalling of the cooling effect of the medium. More particularly, source 23 is seen to generate heat sufficient, in a still atmosphere or in a fluid stream of less than the desired cooling capacity, to cause significant or measurable expansion of shell 21. Rod 25 also tends to expand, but in lesser degree due to its substantially lower coefficient of expansion, with the result that lever arm 15 is pulled to the left, or downwardly, toward base plate 11, and drives sleeve 38 toward hanger 36, as already described, to actuate switch 32. It will be understood that the switch may be constructed for actuation variously by axial contraction and outward bowing of the springs 33 from an initial contact closing or circuit completing position, as shown, and as well by axial expansion and inward flexing of the springs from an initial contact spacing or open circuit position.

Thus for fluid flow detection and control the invention apparatus is mounted with the sensing leg 20 exposed to the conditioning, circulating, exhaust or the like flow or stream such as the controller is designed to regulate. The normal or controlled stream of such system will have a cooling effect sufficient to limit expansion of shell 21 below a predetermined amount. But when the flow past the controller drops below the value which the unit has been set to maintain, this lowering of the cooling effect to or below set point value is sensed and signalled by the control device in the manner described.

A feature of the invention is the provision for compensation of ambient temperature changes. It will be understood that an increase in the ambient temperature and corresponding increase in the temperature of sensing leg 20 would be misinterpreted at lever 15 and consequently at switch 32 as a decrease in fluid flow. But in accordance with the invention, and as already described, the signalling unit 32 forms a part of and is supported also from the ambient compensating leg 30, the dimensions and coefficients of expansion of all components of which are predeterminedly such as to produce, responsive to the same temperature increase, a proportional, compensating expansion. The bow of the struts 33 therefore remains unchanged and the contacts 34 closed. It may be noted in this connection that the design and construction of the invention apparatus permits the interchange of the positions of the sensing and compensating legs 20, 30, predicated only upon the appropriate selection of their dimensions and materials for equal effect upon the motion of the lever 15. My novel controller, then, is insensitive to temperature change and responds only to a decrease in fluid flow to or below the control or set point value.

My invention will be seen to be adapted also to the detection and control of liquid level. For such application the unit may be inserted through the vertical side of a tank, with the legs preferably in the horizontal plane, at the point where the liquid level is to be detected or controlled. When the liquid is at or above the control level, the sensing and signalling legs will be submerged, and the heat generated by source 22 dissipated to and by the liquid, having a relatively high conductivity similarly as the controlled fluid or air stream. Thus under the normal or controlled condition the shell 21 is not permitted to expand, the contacts 34, 34 are held closed, and no signal or indication is made or given. When the liquid level drops so as to expose the legs of the unit to air, having a substantially lesser cooling effect than the liquid, the sensing leg 20 is seen to become heated and the shell 21 to expand so as to lower the lever 15, bow the struts 33, 33 and open the contacts 34, 34, thus sensing or signalling the reduction in liquid level in the same manner as the decrease in fluid flow.

It will be observed that the invention apparatus as herein disclosed is compact, durable, lightweight, hermetically sealed and tamper proof. Manufactured in stainless steel, and without exposed moving parts, it is corrosion and shock resistant and withstands acceleration and vibration. My novel controller is characterized also by automatic reset and by non-sensitivity to environmental and climatic conditions. It can be manufactured for operation in the ambient range of 65° F. to 175° F., under pressures to 100 p. s. i., and for air flow between 200 and 10,000 lb./hr./ft.², giving fast response throughout this range. Commercial embodiments of the device have been shown to respond within two or three seconds to a sudden drop in flow from a value relatively close to the set point, and to react to liquid level change on the order of $\frac{1}{32}''$. The apparatus may, of course, be set for velocity or volume as well as for mass rates of air flow.

From the foregoing it will be appreciated that I have provided a new and improved apparatus employing change of cooling effect for the detection and control of fluid flow and liquid level. My novel control apparatus has been shown further to be of compact and durable design and construction, and to be sensitive, accurate and reliable in operation.

It will be understood that my invention either as to means or method is not limited to the exemplary embodiments or steps here illustrated or described, and I set forth its scope in the following claims.

I claim:

1. For fluid flow and liquid level detection and control, a sealed chamber, a pair of high expansion shells integral and communicating at said chamber, a heater in one and a switch in the other of said shells, and chamber-carried means arranged and connected for positioning by the expansion of said one as compensated by the expansion of said other shell, said means coupled to said switch whereby to actuate said switch responsive directly to said positioning, and thereby to signal change in the cooling effect of the medium subject to detection and control.

2. For fluid flow and liquid level detection and control, a sealed casing, a pair of high expansion shells having endwise support and communicating at said casing, a heater in one of said shells, a low expansion rod supported from the free end of said one shell and projecting into said casing, a push-pull switch supported from the free end of the other of said shells and projecting into said casing, and a casing-mounted lever engaging the inner ends of said rod and switch.

3. Apparatus for fluid flow and liquid level detection and control comprising a rigid sealed casing, a pair of tubular shells supported at one end from and opening into said casing, a heating element in one shell, a low expansion rod adjustably supported at the outer end of said one shell and for expansion into said casing, a push-pull switch anchored at the outer end of the other said shell, and a lever hinged to said casing and engaging both said expansion rod and said switch whereby the expansion of said rod as compensated by the expansion of said other shell directly and positively positions said switch.

4. Apparatus for fluid flow and liquid level detection and control comprising a mounting unit having a compact closed casing defining a hermetically sealed chamber; a sensing unit having an elongate tubular shell rigidly and sealingly joined at one end to said casing and opening into said chamber, a heating element in said shell, and a low expansion rod in said element, said rod adjustably supported at its outer end from said shell and for expansion of its inner end into the chamber; an indicating and ambient compensating unit having an elongate tubular shell rigidly and sealingly joined at one end to said casing and opening into said chamber, and a push-pull switch arranged lengthwise of and for operative flexure in the shell, said switch supported at its outer end from the shell and for shifting of its inner end relative to said chamber; and chamber mounted means for the sensing unit control and ambient compensated actuation of said indicating unit and comprising a lever hinged to said casing, said lever having its arm shiftable relative to said shells and directly and positively joined to said rod and switch.

5. Apparatus for fluid flow and liquid level detection and control comprising a compact unitary supporting mount having a rigid base and defining a sealed chamber; a sensing unit rigidly and sealingly joined to said mount and having a tube supported and communicating at one end and through said base with said chamber, a heating source in the tube, and a low exapnsion rod supported from the outer tube end and for expansion into said chamber; an indicating and ambient compensating unit rigidly and sealingly joined to the mount and having a tube supported and communicating at one end and through said base with said chamber, and a push-pull switch supported from the outer end of said tube and for shifting of its inner end relative to said base; and means for the sensing unit control and ambient compensated actuation of said indicating unit comprising a lever hinged to said base and having an arm shiftable relative to said tubes and joined to said rod, and means for directly and positively coupling said lever to said switch.

References Cited in the file of this patent

UNITED STATES PATENTS 2,619,567  Walbridge _____ Nov. 25, 1952

FOREIGN PATENTS 121,351  Australia _____ Apr. 11, 1946